US009626356B2

(12) United States Patent
Soroker et al.

(10) Patent No.: US 9,626,356 B2
(45) Date of Patent: *Apr. 18, 2017

(54) SYSTEM SUPPORT FOR EVALUATION CONSISTENCY

(71) Applicant: International Business Machines Corporation, Armonk, NY (US)

(72) Inventors: Danny Soroker, Larchmont, NY (US); Justin D. Weisz, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 413 days.

This patent is subject to a terminal disclaimer.

(21) Appl. No.: 14/035,405

(22) Filed: Sep. 24, 2013

(65) Prior Publication Data
US 2014/0172416 A1    Jun. 19, 2014

Related U.S. Application Data

(63) Continuation of application No. 13/718,495, filed on Dec. 18, 2012.

(51) Int. Cl.
*G06F 17/20* (2006.01)
*G06F 17/27* (2006.01)

(52) U.S. Cl.
CPC .......... *G06F 17/2785* (2013.01); *G06F 17/20* (2013.01); *G06F 17/27* (2013.01)

(58) Field of Classification Search
CPC ....... G06F 17/20; G06F 17/27; G06F 17/2785
USPC ................. 702/16, 23, 71, 73, 86; 704/1–10
See application file for complete search history.

(56) References Cited

U.S. PATENT DOCUMENTS

| | | | |
|---|---|---|---|
| 5,450,314 A | 9/1995 | Kagami et al. | 706/46 |
| 6,356,864 B1 * | 3/2002 | Foltz | G06F 17/2785 |
| | | | 434/353 |
| 7,430,552 B2 * | 9/2008 | Cameron | G06F 17/2775 |
| 7,617,090 B2 * | 11/2009 | Wang | G06F 17/30867 |
| | | | 704/270 |
| 7,698,188 B2 * | 4/2010 | Hollas | G06Q 10/0635 |
| | | | 705/35 |
| 7,747,467 B2 | 6/2010 | Minakuchi | 705/26.61 |
| 7,792,667 B2 * | 9/2010 | Chaney | G06F 17/3061 |
| | | | 704/2 |

(Continued)

FOREIGN PATENT DOCUMENTS

WO    WO 01/41014 A1    6/2001    ............. G06Q 30/00

OTHER PUBLICATIONS

Tsang, Alex S. L., and Gerard Prendergast, "Is a "star" worth a thousand words?: The interplay between product-review texts and rating valances", European Journal of Marketing 43.11/12 (2009): 1269-1280.*

(Continued)

*Primary Examiner* — Huyen Vo
*Assistant Examiner* — Rodrigo Chavez
(74) *Attorney, Agent, or Firm* — Ido Tuchman; Daniel P. Morris

(57) ABSTRACT

A system and computer product for validating the consistency between quantitative and natural language textual evaluations. An example method involves computing a numeric score for a textual evaluation, comparing the numeric score to a quantitative evaluation, and producing a rating based on the similarity of the two evaluations.

9 Claims, 5 Drawing Sheets

(56) References Cited

U.S. PATENT DOCUMENTS

| | | | | |
|---|---|---|---|---|
| 2006/0173731 A1* | 8/2006 | Scarpelli | ......... | G06Q 10/06398 705/7.19 |
| 2009/0144226 A1 | 6/2009 | Tateno | ............... | 707/1 |
| 2010/0017391 A1* | 1/2010 | Mizuguchi | ............ | G06Q 10/10 707/E17.014 |
| 2010/0191790 A1* | 7/2010 | Kincaid | ............... | G06K 9/0055 708/274 |
| 2011/0273737 A1* | 11/2011 | Hirao | ................... | G06F 21/105 358/1.14 |
| 2012/0278767 A1* | 11/2012 | Stibel | ................. | G06Q 10/101 715/854 |

OTHER PUBLICATIONS

Bo Pang and Lillian Lee, Jun. 2005, Proceedings of the 43rd Annual Meeting of the ACL, pp. 115-124.

Bo Pang and Lillian Lee, Opinion Mining and Sentiment Analysis. Found. Trends Inf. Retr, vol. 2, No. 1-2 (Jan. 2008), p. 1-135.

Theresa Wilson, Paul Hoffmann, Swapna Somasundaran, Jason Kessler, Janyce Wiebe, Yejin Choi, Claire Cardie, Ellen Riloff, and Siddharth Patwardhan, OpinionFinder: a system for subjectivity analysis. In Proceedings of HLT/EMNLP on Interactive Demonstrations (HLT-Demo '05), Association for Computational Linguistics, Stroudsburg, PA, USA, p. 34-35 (2005).

Eudora Moodwatch, http://www.eudora.com/email/features/moodwatch.html, p.

* cited by examiner

Berry's Auto Dealership
Bronx, NY 10466

Customer Review ★☆☆☆☆

The transaction went seamlessly to say the least and (they) even introduced me to the service team where I scheduled my first appointment, before I even left the dealership. I couldn't have asked for a better experience.

Fig. 4

SYSTEM SUPPORT FOR EVALUATION CONSISTENCY

CROSS-REFERENCE TO RELATED APPLICATIONS

This application claims priority under 35 U.S.C. §120 to U.S. patent application Ser. No. 13/718,495 filed Dec. 18, 2012, the entire text of which is specifically incorporated by reference herein.

BACKGROUND

This invention relates to electronic evaluations, and more particularly to a system and a method for validating consistency between the quantitative and textual aspects of the evaluation.

Current evaluation and rating systems allow an evaluator to input quantitative and textual evaluations for a specified item. These evaluations are then used to assess the product. The quantitative aspect is usually used for a preliminary quick assessment, and the textual evaluation gives a more in depth assessment for an assessor with more time and interest.

For example, a website selling goods on the internet will allow a purchaser to evaluate an item with a textual and quantitative evaluation. This evaluation will typically proceed unchanged to be used by the business logic behind the website or a potential purchaser to assess the product.

BRIEF SUMMARY

Accordingly, one example of the present invention is a system for validating the consistency between quantitative and natural language textual evaluations of an item. This system includes a computer processor and a computing module coupled to the computer processor. The computing module is configured to compute a numeric score from an inputted textual evaluation based on a textual analysis of the inputted textual evaluation. A comparing module coupled to the computer processor is configured to determine the degree to which the numeric score and the quantitative evaluation are consistent with each other. A calculating module coupled to the computer processor is configured to calculate a similarity rating from the comparison of the inputted quantitative evaluation and the numeric score.

A further example of the invention is a computer program product for validating the consistency between quantitative and natural language textual evaluations of an item. The computer program product includes computer readable program code configured to compute a numeric score from an inputted textual evaluation based on a textual analysis of the inputted textual evaluation, compare the numeric score to an inputted quantitative evaluation, and calculate a similarity rating from the comparison of the inputted quantitative evaluation and the numeric score.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 shows an example of an inconsistent online evaluation in accordance with one embodiment of the present invention.

DETAILED DESCRIPTION

Figure 1:
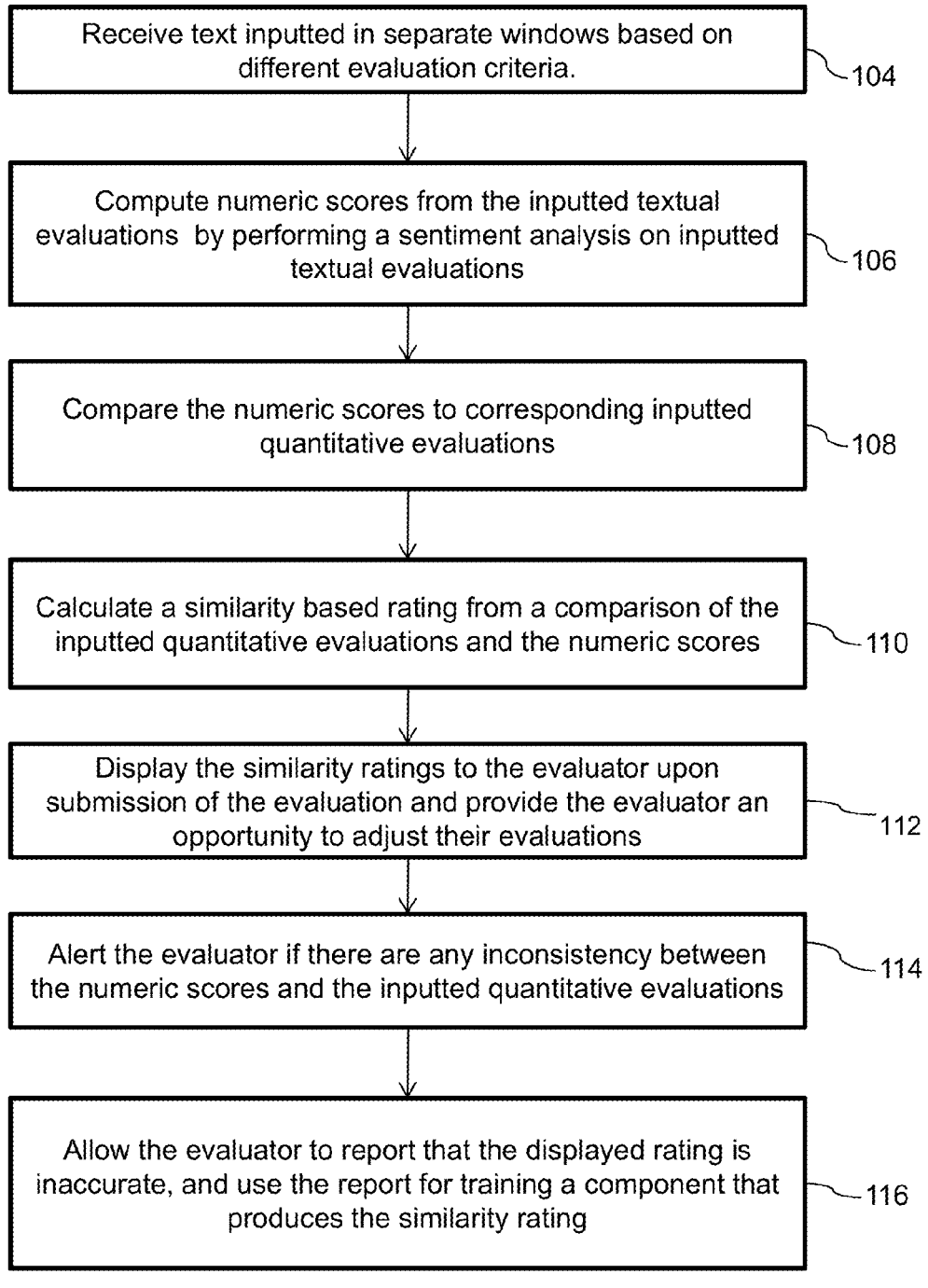
FIG. 1 shows a method for validating the consistency between quantitative and natural language textual evaluations of an item in accordance with one embodiment of the present invention.

The present invention is described with reference to embodiments of the invention. Throughout the description of the invention reference is made to FIGS. 1-5. When referring to the figures, like structures and elements shown throughout are indicated with like reference numerals.

Embodiments of the present invention can analyze the textual evaluation of an item, extract numerical scores from the text that correspond to the categories of the numerical ratings of the item, and compare the extracted numerical scores to the scores assigned by the user. If a discrepancy is found between the assigned numerical scores and the extracted numerical scores, embodiments of the invention can provide facilities for choosing one score over another based on predefined business logic, and/or displaying the discrepancy in the user interface to enable the user to change his ratings or evaluation to be more consistent. In addition, embodiments of the invention can be used after an evaluation has been made by showing other users how well the numerical ratings match the textual evaluation. Embodiments of the invention can help increase user confidence when entering evaluations and also when judging the trustworthiness of online ratings and evaluations.

FIG. 1 shows a method 102 for validating the consistency between quantitative and natural language textual evaluations of an item in accordance with one embodiment of the present invention. The method includes a text input step 104. During step 104 textual evaluations may be inputted in text boxes of single or separate windows based on different evaluation criteria. A textual evaluation is a piece of free form text written by an evaluator that describes qualities or properties of the item being evaluated and the evaluator's opinion of those qualities or properties. After text inputting step 104 is completed, the method continues to computing step 106.

At computing step 106, multiple numeric scores may be computed from the inputted textual evaluations based on a textual analysis of the inputted textual evaluations. Computing the numeric scores may include performing a sentiment analysis on the inputted textual evaluation. The sentiment analysis involves determining the polarity of written text by spotting terms that are rated with positive polarity and other terms having negative polarities, and summing the results to get the numeric score.

The numeric score may be either an exact rating, such as 4 stars, a probability distribution, such as 3.5 stars with a standard deviation of 1 star, or an inexact score, such as "positive". A general sentiment analysis may be used to produce a single numeric score from a textual evaluation. Other sentiment analysis algorithms can be used that produce numerical scores for domain specific facets of an item. For example, a sentiment annotator can be produced that specifically captures sentiment related to quality of service, whereas a different sentiment annotator can be produced that specifically captures sentiment related to cleanliness. In this way, multiple numerical scores can be produced from one or more textual evaluations to match the numerical evaluations given by a user. After computing step 106 is completed, the method continues to comparing step 108.

At comparing step 108, the numeric scores are compared to inputted quantitative evaluations. A quantitative evaluation is a quantitative score given to an item, or a specific facet of the item, by the user. This comparison may be accomplished by using correlation or cosine similarity comparators to determine the degree to which these ratings are consistent with each other. After comparing step 108 is completed, the method continues to calculating step 110.

At calculating step 110, a similarity rating is calculated from the results of comparing the numeric score to the inputted textual evaluation. After calculating step 110 is completed, the method continues to adjusting step 112.

At adjusting step 112, the evaluator can adjust her evaluation. The similarity rating is displayed upon submission of the evaluation, providing the evaluator an opportunity to adjust her evaluations. After adjusting step 112 is completed, the method continues to alerting step 114.

At alerting step 114, the evaluator is alerted if there is an inconsistency between the numeric score and the inputted quantitative evaluation. After alerting step 114 is completed, the method continues to reporting step 116.

At reporting step 116, the evaluator can report that the displayed rating is inaccurate. This report can be used for training a component that produces the similarity rating, to increase the accuracy of the component.

Figure 2:
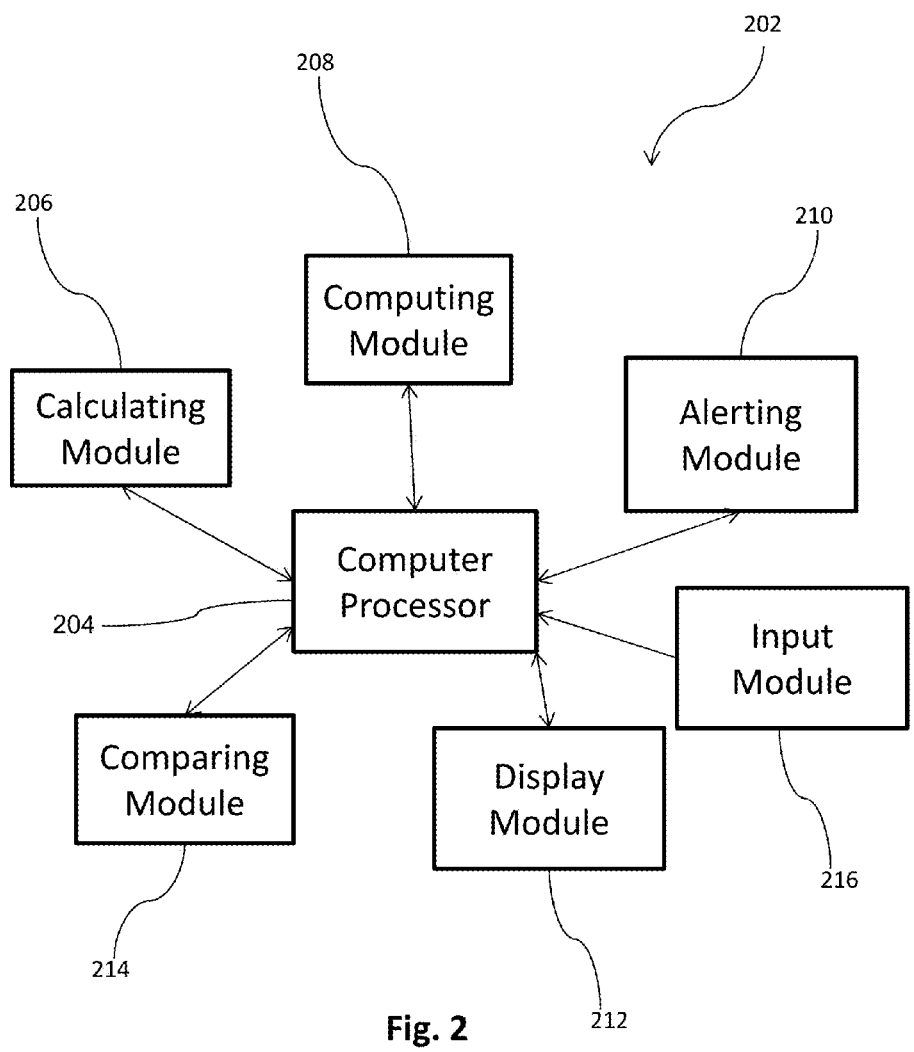
FIG. 2 shows a system for validating the consistency between quantitative and natural language textual evaluations of an item in accordance with one embodiment of the present invention.

FIG. 2 shows a system 202 for validating the consistency between quantitative and natural language textual evaluations of an item in accordance with one embodiment of the present invention. In one embodiment the system 202 includes a computer processor 204, a computing module 208, a comparing module 214, and a calculating module 206. The computing module 208 receives a natural language textual evaluation from the computer processor 204, computes a numeric score from the textual evaluation based on a textual analysis of the textual evaluation, and returns the numeric score to the computer processor 204. The comparing module 214 receives a numeric score and a quantitative evaluation from the computer processor 204, determines the degree to which the numeric score and quantitative evaluation are consistent with each other, and returns a comparison result to the computer processor 204. The calculating module 206, receives a comparison result from the computer processor 204, calculates a similarity rating from the comparison result, and returns the similar based rating to the computer processor 204.

In one embodiment an input module 216 may be used to input multiple quantitative evaluations based on different evaluation criteria. The input module 216 may allow for text to be inputted in separate windows based on different evaluation criteria.

In one embodiment the computing module 208 may compute the numeric score by performing a sentiment analysis on the inputted textual evaluation, the sentiment analysis involves determining the polarity of written text by spotting terms that are rated with positive polarity and other terms having negative polarities, and summing the results to get the numeric score. The computing module 208 may compute multiple numeric scores for the inputted textual evaluation based on multiple predetermined evaluation criteria.

In one embodiment a display module 212 may be used to display the numeric score as at least one of an exact rating and probability distribution.

In one embodiment the comparing module 214 may produce the similarity rating using either Pearson's correlation or cosine similarity.

In one embodiment an alert module 210 can alert an evaluator if the inconsistency between the numeric score and the quantitative evaluation is above a defined level.

In one embodiment an input module 216 may allow the evaluator to report that a displayed rating is inaccurate. This report can be used to train the component that produces the similarity rating to increase the accuracy of the similarity comparison. The input module in this embodiment may be a separate component than the input module in other embodiments.

In one embodiment, if the inconsistency between the numeric score and the quantitative evaluation is above a defined level the system can pick one of the two ratings to use based on some predefined or dynamic business logic. In another embodiment, if the inconsistency is above the defined level, the system can ignore the discrepancy and store both sets of ratings, or perform another computation on the ratings, such as taking an average, to produce a single score.

In one embodiment a display module 212 may be used to display the similarity rating to the evaluator upon submission of the evaluation and provide the evaluator an opportunity to adjust his evaluations through input module 216.

Figure 3:
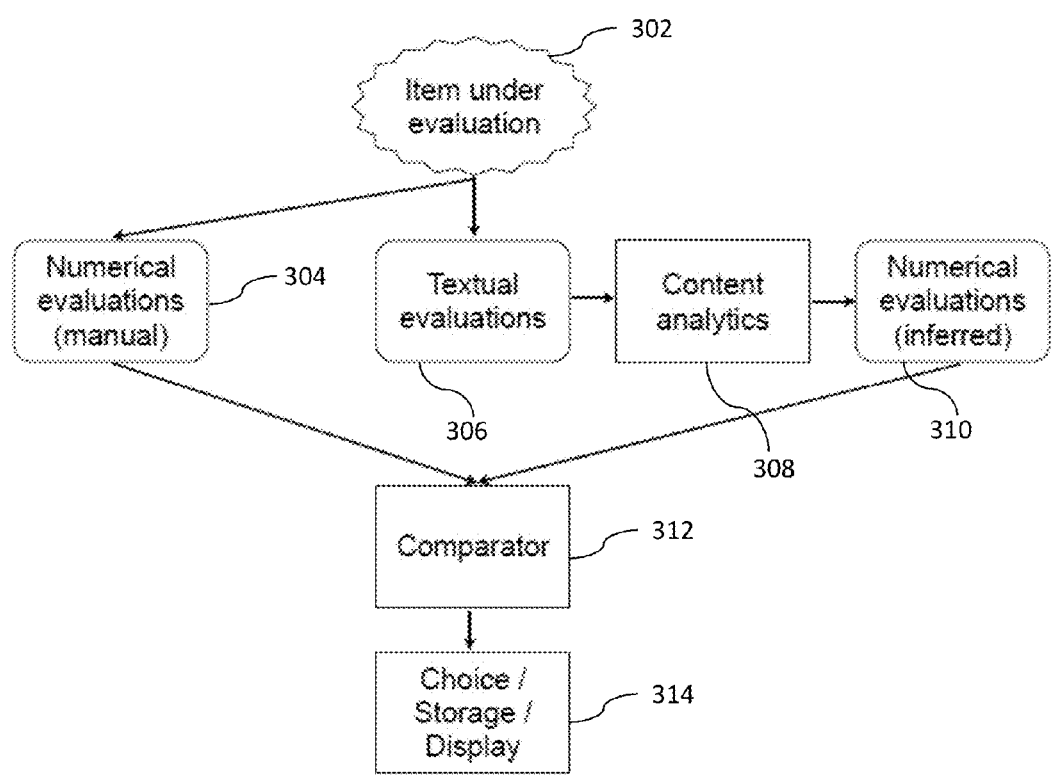
FIG. 3 shows the system operation in accordance with one embodiment of the present invention.

FIG. 3 shows an example structure of the system. For some item under evaluation 302 by a user, the user produces two kinds of evaluations: numerical evaluations 304 and textual evaluations 306.

Numerical evaluations 304 are commonly given as a single numerical score to the item as a whole, such as when an item is rated on a 1 to 5 star scale. However, an item may have multiple numerical ratings if specific qualities or dimensions of that item are being evaluated. For example, a car dealership may be rated on its customer service, its prices, its hours, and its selection.

A textual evaluation 306 is a piece of free-form text written by an evaluator that describes qualities or properties of the item being evaluated and the evaluator's opinion of those qualities or properties. Commonly, a single textual evaluation is written for an item being evaluated, but evaluation systems may have users write multiple textual evaluations focused on different qualities or properties of an item.

The system uses content analytics 308 to produce numerical scores 310 from the textual evaluations. One type of content analytics method that can be used to produce numerical scores is sentiment analysis. Sentiment analysis typically determines the polarity of written text, e.g., whether it is positive or negative. With sentiment analysis, one can produce a numerical rating 310 corresponding to the degree to which the textual evaluation is positive or negative. In addition to a generalized sentiment analysis that produces a single numerical score from a textual analysis, other sentiment analysis algorithms can be used that produce numerical scores for domain-specific facets of an item. For example, a sentiment annotator can be produced that specifically captures sentiment related to quality of service, whereas a different sentiment annotator can be produced that specifically captures sentiment related to cleanliness. In this way, multiple numerical scores can be produced from one or more textual evaluations to match the numerical evaluations given by a user. The results of analysis may produce an exact rating, e.g., 4 stars, or a probability distribution, e.g., a normal distribution with mean of 3.5 stars, and standard deviation of 1 star.

Once the set of numerical ratings 304 assigned by the user and the set of numerical ratings 310 produced from the user's textual evaluations has been obtained, a comparator 312 can be used to determine the degree to which these ratings are consistent with each other. Simple comparators may include correlation (e.g., Pearson's correlation) or cosine similarity.

After the consistency of the numerical ratings 304 and the textual evaluations 306 are determined, the system may display the results, store the results, or query the user for more action in a choice/storage/display module 314. For rating pairs that are below a defined level of consistency, the system has several options it can perform, such as:

1. The system can pick one of the two ratings to use based on some pre-defined or dynamic business logic. For example, an online site may always prefer manually-entered numerical ratings over those produced from text.

2. The system can present the discrepancy to the user and provide the user an opportunity to adjust her numerical ratings or her textual evaluation.

3. The system can ignore the discrepancy and store both sets of ratings, or perform another computation on the ratings (such as taking an average) to produce a single score.

Once a user has submitted his evaluations, his evaluations can be used as feedback into the content analysis algorithm to improve its performance.

FIG. 4 shows an example of an inconsistent online evaluation in accordance with one embodiment of the present invention. The words "seamlessly" and "better" are recognized during the analysis and given a positive polarity, driving the numeric score in a favorable direction. Since there are no words with a negative polarity the resultant numeric score is favorable. The inputted quantitative evaluation is of one star, this is not favorable and results in an inconsistent evaluation.

Figure 5:
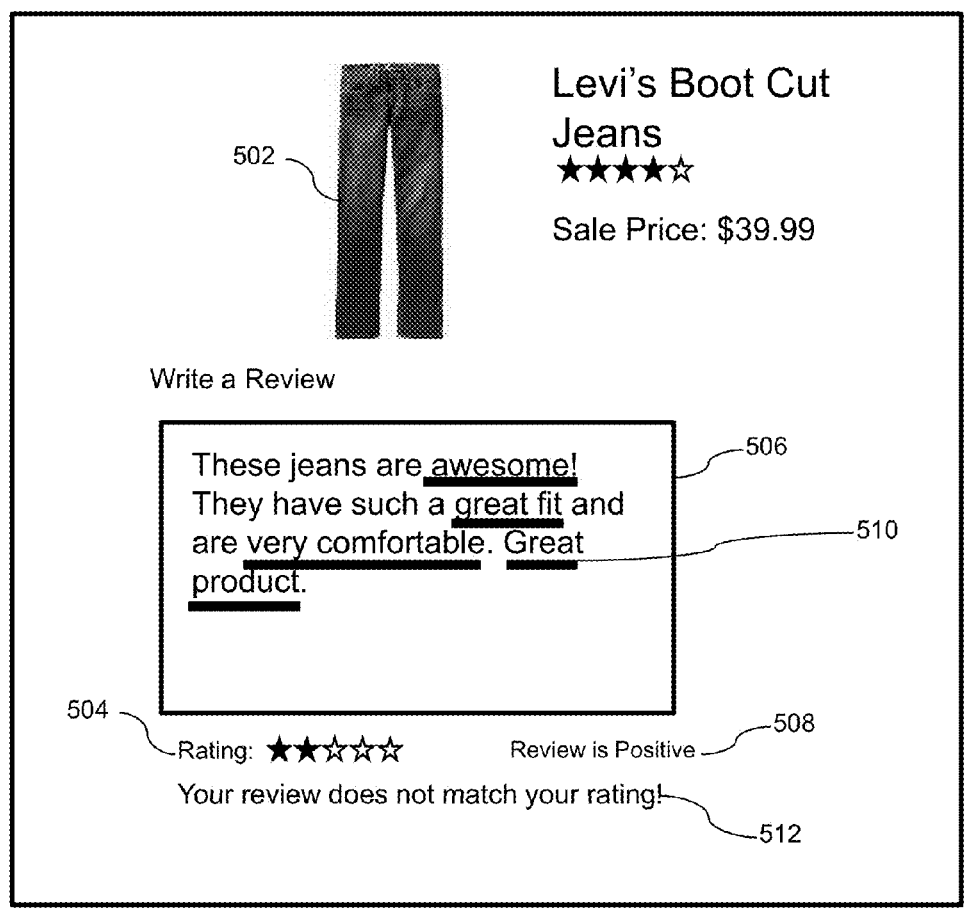
FIG. 5 shows an example of a user interface in accordance with one embodiment of the present invention.

FIG. 5 shows an example of a user interface in accordance with one embodiment of the present invention. The item under review 502 is the item being evaluated by the evaluator. The quantitative evaluation 504, listed as a rating in the figure, is a quantitative score inputted by the user for her review of the item as a whole. The textual evaluation 506, listed as a review in the picture, is a piece of free form text written by the evaluator that describes the qualities or properties of the item being evaluated and the evaluator's opinion of those qualities or properties. The numeric score 508, is computed from the textual evaluation and may be present in an inexact form, "positive" as shown in the figure, or an exact form, such as five stars. The detected text 510, is specific text in the evaluation that was detected by the computing module and led to the numeric score. The similarity rating 512, shows the discrepancy between the quantitative evaluation and the numeric score.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium(s) may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for validating consistency between quantitative and natural language textual evaluations of an item, the method comprising:
   receiving a quantitative evaluation of the item from an evaluator;
   receiving a natural language textual evaluation of the item from the evaluator;
   computing a numeric score for the natural language evaluation based on a textual analysis of the natural language textual evaluation;
   comparing the numeric score to an inputted quantitative evaluation;
   calculating a similarity rating from the comparison of the quantitative evaluation and the numeric score; and
   alerting an evaluator when an inconsistency between the numeric score and the quantitative evaluation is above a defined level by displaying an alert in a user interface.

2. The method of claim 1, wherein computing the numeric score includes performing a sentiment analysis on the natural language textual evaluation, the sentiment analysis includes determining a polarity of written text by locating terms that are rated with positive polarity and other terms having negative polarities, and summing the results to get the numeric score.

3. The method of claim 1, further comprising computing multiple numeric scores created for the natural language textual evaluation based on multiple predetermined evaluation criteria.

4. The method of claim 1, further comprising receiving text inputted in separate windows based on different evaluation criteria.

5. The method of claim 1, further comprising receiving multiple quantitative evaluations based on different evaluation criteria.

6. The method of claim 1, wherein the numeric score and the quantitative evaluation are compared by using at least one of Pearson's correlation and cosine similarity.

7. The method of claim 1, further comprising displaying the similarity rating to the evaluator upon submission of the evaluation and provide the evaluator an opportunity to adjust her evaluations.

8. The method of claim 1, further comprising increasing the accuracy of the similarity comparison by allowing the evaluator to issue a report that a displayed similarity rating is inaccurate, and using the report for training a component that produces the similarity rating.

9. The method of claim 1, wherein the numeric score is any one of an exact rating and probability distribution.

* * * * *